UNITED STATES PATENT OFFICE.

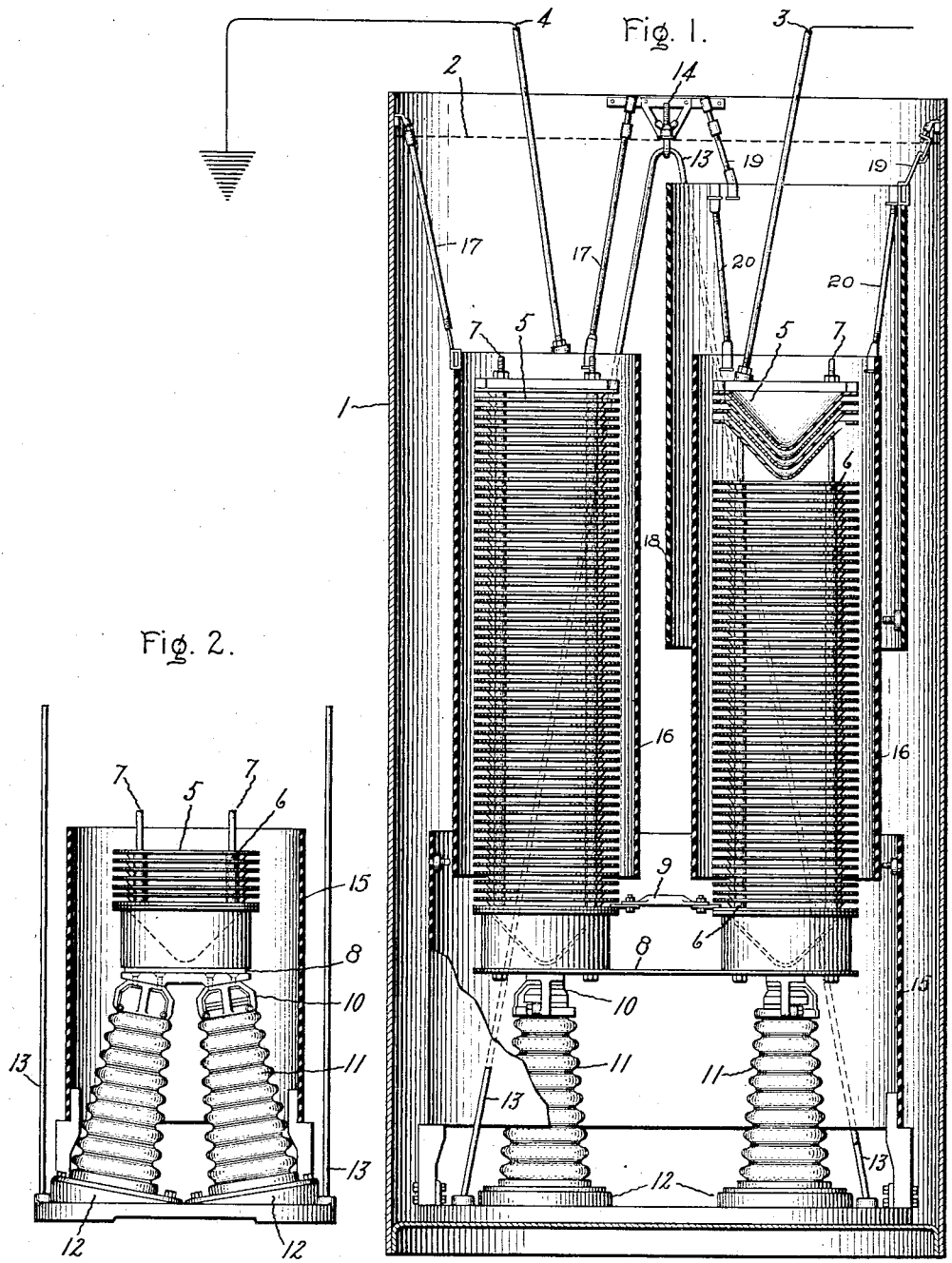

VICTOR E. GOODWIN, OF SCHENECTADY, NEW YORK, ASSIGNOR TO GENERAL ELECTRIC COMPANY, A CORPORATION OF NEW YORK.

PROTECTIVE DEVICE.

1,161,656.   Specification of Letters Patent.   Patented Nov. 23, 1915.

Application filed July 9, 1912. Serial No. 708,423.

*To all whom it may concern:*

Be it known that I, VICTOR E. GOODWIN, a citizen of the United States, residing at Schenectady, county of Schenectady, State of New York, have invented certain new and useful Improvements in Protective Devices, of which the following is a specification.

My invention relates to protective devices for transmission lines and similar systems of electric distribution subjected to abnormal voltages, surges and oscillations, and more particularly to protective devices of the electrolytic condenser type suitable for use on systems having an operating potential of about 90,000 volts or more.

A desirable form of protective device for relieving transmission systems of abnormal voltages, surges and similar disturbances, commonly designated as lightning, is the electrolytic cell or condenser, in which electrodes of aluminum or some similar metal are immersed in a suitable electrolyte. One form of electrolytic cell or condenser often used, consists essentially of a number of dished or cupshaped electrodes shaped to hold electrolyte and mounted one above the other with spaces between them for the electrolyte. To improve the insulation of the device and to assist in the dissipation of the heat generated in it by discharges, the electrodes are immersed in a metal tank filled with oil or other insulating liquid which is lighter than the electrolyte and consequently will not displace the electrolyte from between the electrodes. One form of cell or condenser of this general type is shown in my Patent No. 987,622, March 21st, 1911. The number of electrodes required in a protective device of this type depends upon the normal operating voltage of the system to be protected. When the normal operating voltage is about 90,000 volts or more the number of electrodes required is so great that mechanical difficulties are introduced in supporting a large number of electrodes one above the other, and the stack of electrodes or cones become so high that an objectionable amount of head room is required for the protective device. Usually the upper end of the stack of electrodes is connected to the line to be protected while the lower end is connected to the oil tank, which in turn is connected to ground. No matter how good a ground connection is made for the tank, there is danger that when lightning strikes the line, the ground connection will offer so much impedance to the discharge of the high frequency oscillations that the tank will momentarily acquire a potential high enough to injure any one who should happen to touch the tank at the instant of the lightning discharge. It is not feasible to use two protective devices of the usual construction connected in series for potentials of 90,000 volts or more, as the arresters cannot be connected in series unless they are mounted upon insulators which will withstand the line potential. The oil tanks with the oil in them are so heavy that it is not practicable to make insulators which are strong enough electrically and mechanically to support the heavy oil tanks and at the same time insulate them against potential of 90,000 volts or more.

The object of my invention is to provide a protective device, particularly of the electrolytic condenser type, having a sufficient number of electrodes connected in series to withstand normal line potentials of 90,000 volts or more without being unduly high or requiring an excessive amount of head room; in which all of the live parts are insulated from the tank, so that the tank is always dead and is not dangerous even during the passage of the lightning discharge through the arrester; in which the insulators for supporting the live parts of the discharge path are subjected to such slight mechanical strains that the insulators can easily be made to withstand them and also to withstand the potential of the system to which the device is applied; in which all of the electrodes and other parts of the arrester forming the discharge path may easily be taken out of the tank for inspection or repair and easily replaced in the tank; in which circulation of the oil is facilitated by insulating barriers or shields supported in a simple and improved manner; and which is in many particulars hereinafter pointed out an improvement upon the protective devices heretofore generally used.

My invention will best be understood in connection with the accompanying drawing, which, merely for purposes of illustration, shows one of the various forms in which my invention may be embodied and in which—

Figure 1 is a longitudinal section of a lightning arrester embodying my invention; and Fig. 2 is a view partly in section of the insulating support and the lower end of one of the stacks of electrodes lifted out of the tank and viewed at right angles to the plane of the section of Fig. 1.

In the particular form of device shown in the drawings the tank 1, preferably of metal, is filled with oil or other suitable insulating liquid to the level of the dotted line 2 and contains submerged in the oil, the current carrying parts of the discharge path through the protective device. In the device shown in the drawings, the discharge path comprises two current limiting condensers of the electrolytic type mounted side by side and connected in series. In the particular form of device shown, one of the cells or condensers is connected to the line through an insulated terminal 3 extending out of the top of the tank and the other condenser is connected to ground through a similar insulated terminal 4 also extending through the top of the tank and connected to ground through any suitable connection. A discharge from line to ground will pass through the electrolytic condensers connected in series. All of the live parts are insulated from the tank 1, which is preferably oval in cross section.

The particular form of electrolytic cell or condenser which I prefer to use consists of a number of dished or cup-shaped aluminum electrodes 5 mounted one above the other and spaced apart a short distance to leave a space for the electrolyte. The electrodes are spaced apart by insulating washers 6 and are held together by tie rods 7 extending the length of the stack of electrodes. In the particular form of device shown in the drawing the tie rods firmly hold the electrodes to one another and also to a rack or plate 8 on which the two stacks of electrodes are mounted side by side. Each stack of electrodes or cones forms an electrolytic condenser which will hold back about one-half of the normal line voltage. When the two cells or condensers are connected in series in any suitable way as by a conducting connection 9 between the bottom electrode of each condenser, the two condensers in series will hold back the normal operating potential of the system but will permit an abnormal potential to discharge freely to ground. The upper electrode of one condenser is connected to the insulated line terminal 3 while the upper electrode of the other condenser is connected to the insulated ground terminal 4.

The two current limiting electrolytic condensers are mounted side by side in the tank 1 in such a manner as to permit their easy removal from the tank for inspection and repair, and are also insulated from the tank by being mounted upon some suitable insulating support which will insulate the live parts of the condenser from ground. As the electrodes of the cells or condensers are comparatively light, the weight to be carried by the insulating support for the condensers is comparatively small and insulators having ample mechanical and electrical strength may easily be obtained for the insulating support.

In the particular form of device shown in the drawings, the insulating support for the condensers is removably mounted in the tank at the bottom. This support comprises caps 10 for supporting the rack or plate 8, each cap being mounted on a pair of insulators 11 which carry the weight of the condensers and insulate all live parts from the tank. The insulators of each pair are so mounted that they incline toward each other, as best shown in Fig. 2, so as to give as wide a space as possible and prevent tilting of the condenser. The insulators 11 are in turn mounted on an oblong base 12 which rests on the bottom of the tank and can easily be lifted out of the tank.

The cells or condensers and the insulating support on which they are mounted can easily be lifted bodily out of the oil tank for inspection and repair and then be replaced with a minimum of trouble. To facilitate this operation I provide a lifting loop 13 on each side of the base 12. These loops extend to a point near the top of the tank where they are easily reached. They are normally held in place by latches 14 secured to the wall of the tank.

As the insulators 11 are constructed to withstand the full potential of the line, the condensers and all of the current carrying parts of the discharge path are thoroughly insulated from ground and from the tank 1 so that under all conditions the oil tank 1 is dead and may be safely touched by the operator at any time. The head room required for each arrester is very materially reduced owing to the fact that the required number of electrodes are arranged in the form of two or more stacks mounted side by side and connected in series, instead of all of the electrodes being mounted in one stack.

In order to facilitate the circulation of the oil, I provide an insulating barrier 15 which is mounted on the base 12 and encircles both of the electrolytic cells or condensers and the insulators on which the condensers rest. As shown in the drawing, this barrier is completely submerged in the oil and is spaced away from the walls of the tank and also from the condenser so as to provide ample space for the circulation of the oil.

It has been found that when a very heavy discharge passes through the cells of the type shown in the drawings, there is a tendency for the electrolyte to be thrown from between the electrodes. The electrolyte is conducting and the arrester is short circuited to some extent when the electrolyte strikes against the metal walls of the tank. In order to avoid this difficulty, I surround each cell with an insulating shield 16 preferably made in the form of an inclosing cylinder which extends practically the entire length of the cell and is spaced away from the edges of the electrodes a sufficient distance to permit free circulation of the oil but close enough to intercept any electrolyte thrown from between the electrodes. The shield may be mounted in any way, but in the preferred construction shown in the drawing, the shield is suspended by insulating members 17 from points near the upper edge of the tank. As a result of this construction the insulating shields can easily be placed in position or easily removed by merely detaching the insulating members 17, and then lifting the members and the shield out of the tank. The insulating shields are of such a length that their lower ends project below the upper edge of the insulating barrier 15.

In order to avoid any possibility of discharge directly across from the line terminal 3 to the ground terminal 4, I surround the line terminal with an insulating protector or extra protecting shield 18 which is preferably made in the form of a cylinder of insulation large enough to inclose both the line terminal 3 and the upper end of the insulating shield 16 of that condenser which is connected directly to the line. This insulating protector 18 is also suspended from the upper edge of the tank by insulating members 19 and may be removed in the same way as the insulating shields 16. In the preferred construction, as shown in the drawings, the insulating protector 18 is suspended from the tank while the insulating shield 16 is suspended from the upper edge of the insulating protector by insulating members 20, so that when the insulating protector is lifted out the insulating shield comes with it. In some cases I provide both terminals with insulating protectors 18, thereby securing a high degree of protection against breakdown between terminals.

My invention may be embodied in many other forms than that shown and described and I therefore do not limit my invention to the precise arrangement disclosed, but intend to cover all changes and modifications within the spirit of my invention and the scope of the appended claims.

What I claim as new and desire to secure by Letters Patent of the United States, is,—

1. In a protective device, the combination with a tank containing an insulating liquid and an electrolytic condenser removably submerged in said liquid, of an insulating support for said condenser comprising a base detachably positioned in said tank, an insulator secured at one end to said base, and means for securing said condenser to the other end of said insulator.

2. In a protective device, the combination with a tank containing an insulating liquid and an electrolytic condenser submerged in said liquid, of an insulating support for said condenser removably positioned at the bottom of said tank, and an insulator secured at its lower end to said support and at its upper end to said condenser.

3. A protective device comprising a tank containing insulating liquid, an electrolytic condenser submerged in said liquid, an insulating support for said condenser, an insulating barrier mounted on said support to inclose the lower part of said condenser, an insulating shield surrounding said condenser with its lower edge below the upper edge of said insulating barrier, and insulating means for suspending said shield from the upper edge of said tank.

4. A protective device comprising a tank containing insulating liquid, an insulating support in said tank, two electrolytic cells mounted on said support below the level of said liquid and connected in series, each cell comprising a plurality of cup-shaped electrodes mounted one above the other, an insulated line terminal for the upper electrode of one cell, an insulated ground terminal for the upper electrode of the other cell, insulating shields submerged in said liquid to inclose said cells, and an insulating protector submerged in said liquid to inclose the upper end of the shield of the cell which is connected to the line terminal.

5. A protective device comprising a tank containing insulating liquid, an insulating support in said tank, two electrolytic cells mounted on said support below the level of said liquid and connected in series, a cylindrical insulating shield inclosing each of said cells, an insulating barrier mounted on said support to inclose both said shields, and an insulating protector inclosing the upper end of one of said shields.

In witness whereof, I have hereunto set my hand this 8th day of July, 1912.

VICTOR E. GOODWIN.

Witnesses:
 BENJAMIN B. HULL,
 HELEN ORFORD.